United States Patent
Leach et al.

(10) Patent No.: US 9,205,734 B1
(45) Date of Patent: Dec. 8, 2015

(54) MOTOR INTEGRATION ASSEMBLY

(71) Applicant: XL Hybrids, Boston, MA (US)

(72) Inventors: Brian Joseph Leach, Pawlet, VT (US); Neal Ennis Brenner, Needham, MA (US); Jason Paul Hafer, Reading, MA (US); Joseph D. McCabe, Quincy, MA (US)

(73) Assignee: XL Hybrids, Boston, MA (US)

( * ) Notice: Subject to any disclaimer, the term of this patent is extended or adjusted under 35 U.S.C. 154(b) by 0 days.

(21) Appl. No.: 13/646,242

(22) Filed: Oct. 5, 2012

Related U.S. Application Data

(60) Provisional application No. 61/543,940, filed on Oct. 6, 2011.

(51) Int. Cl.
*B60K 6/442* (2007.10)

(52) U.S. Cl.
CPC ...................................... *B60K 6/442* (2013.01)

(58) Field of Classification Search
CPC ................................. B60K 6/442; B60K 6/42
USPC .......... 180/311, 312, 313, 65.21, 65.22, 65.23
See application file for complete search history.

(56) References Cited

U.S. PATENT DOCUMENTS

| | | | |
|---|---|---|---|
| 1,696,599 A | 12/1928 | Forsberg | |
| 1,790,634 A | 1/1931 | Arendt | |
| 2,132,450 A * | 10/1938 | Wolf | 180/69.6 |
| 3,493,066 A | 2/1970 | Dooley | |
| 3,732,751 A | 5/1973 | Berman et al. | |
| 3,874,472 A * | 4/1975 | Deane | 180/65.245 |
| 3,923,115 A | 12/1975 | Helling | |
| 4,042,056 A | 8/1977 | Horwinski | |
| 4,233,858 A | 11/1980 | Rowlett | |
| 4,305,254 A | 12/1981 | Kawakatsu et al. | |
| 4,811,804 A * | 3/1989 | Ewers et al. | 180/53.8 |
| 5,125,469 A | 6/1992 | Scott | |
| 5,161,638 A * | 11/1992 | Hirano | 180/312 |
| 5,267,623 A * | 12/1993 | Kashiwagi | 180/58 |
| 5,272,939 A | 12/1993 | Markyvech et al. | |
| 5,359,228 A | 10/1994 | Yoshida | |
| 5,441,122 A | 8/1995 | Yoshida | |
| 5,487,002 A | 1/1996 | Diller et al. | |
| 5,490,063 A | 2/1996 | Genise | |
| 5,558,588 A | 9/1996 | Schmidt | |
| 5,627,752 A | 5/1997 | Buck et al. | |
| 5,778,326 A | 7/1998 | Moroto et al. | |
| 5,856,709 A | 1/1999 | Ibaraki et al. | |
| 5,927,829 A | 7/1999 | Saga et al. | |
| 6,176,808 B1 | 1/2001 | Brown et al. | |
| 6,269,290 B1 | 7/2001 | Egami et al. | |
| 6,314,347 B1 | 11/2001 | Kuroda et al. | |
| 6,328,671 B1 * | 12/2001 | Nakajima et al. | 477/46 |
| 6,356,818 B1 | 3/2002 | Wakashiro et al. | |
| 6,367,570 B1 | 4/2002 | Long, III et al. | |
| 6,520,160 B2 | 2/2003 | Kojima et al. | |
| 6,533,692 B1 * | 3/2003 | Bowen | 475/5 |
| 6,630,813 B2 | 10/2003 | Berels et al. | |
| 6,668,954 B2 * | 12/2003 | Field | 180/65.23 |

(Continued)

*Primary Examiner* — Hau Phan
(74) *Attorney, Agent, or Firm* — Fish & Richardson P.C.

(57) ABSTRACT

A motor integration assembly includes a supporting structure for connecting a transmission of a vehicle to a drivetrain of the vehicle, wherein the support structure includes a housing to receive a portion of the drivetrain of the vehicle. The motor integration assembly also includes a torque transfer unit for transferring torque from an electric machine to the portion of the drivetrain of the vehicle.

22 Claims, 9 Drawing Sheets

(56) References Cited

U.S. PATENT DOCUMENTS

| | | |
|---|---|---|
| 6,687,581 B2 | 2/2004 | Deguchi et al. |
| 6,826,460 B2 | 11/2004 | Kittell et al. |
| 6,868,927 B2 | 3/2005 | Boll et al. |
| 7,013,205 B1 | 3/2006 | Hafner et al. |
| 7,104,347 B2 | 9/2006 | Severinsky et al. |
| 7,214,156 B2 | 5/2007 | Oliver |
| 7,258,183 B2 | 8/2007 | Leonardi et al. |
| 7,271,555 B1 | 9/2007 | Ciccone |
| 7,367,415 B2 | 5/2008 | Oliver et al. |
| 7,395,887 B2 | 7/2008 | Viergever et al. |
| 7,419,021 B2 | 9/2008 | Morrow et al. |
| 7,434,640 B2 | 10/2008 | Hughes |
| 7,434,641 B2 | 10/2008 | Takami et al. |
| 7,559,578 B2 * | 7/2009 | van Leeve et al. ............ 180/311 |
| 7,610,124 B2 | 10/2009 | Wakashiro et al. |
| 7,647,994 B1 | 1/2010 | Belloso |
| 7,647,997 B2 | 1/2010 | Oliver |
| 7,665,560 B2 * | 2/2010 | Gelinas ......................... 180/65.6 |
| 7,674,994 B1 * | 3/2010 | Valerio ........................... 209/571 |
| 7,681,676 B2 * | 3/2010 | Kydd ........................... 180/65.21 |
| 7,849,944 B2 | 12/2010 | DeVault |
| 7,921,950 B2 | 4/2011 | Harris |
| 7,926,387 B2 * | 4/2011 | Horiuchi et al. ............. 180/312 |
| 7,954,579 B2 | 6/2011 | Rodriguez et al. |
| 8,215,442 B2 * | 7/2012 | Ishii ............................... 180/292 |
| 8,256,549 B2 * | 9/2012 | Crain et al. ................ 180/65.31 |
| 8,337,359 B2 * | 12/2012 | Hofbauer ........................ 477/5 |
| 8,469,137 B2 * | 6/2013 | Fujii ............................... 180/312 |
| 8,596,391 B2 * | 12/2013 | Kshatriya ................. 180/65.22 |
| 8,630,784 B2 | 1/2014 | Bai |
| 2003/0010563 A1 * | 1/2003 | Osuga et al. ................... 180/311 |
| 2005/0205313 A1 * | 9/2005 | Gilmore et al. ............. 180/65.2 |
| 2006/0000650 A1 * | 1/2006 | Hughey ....................... 180/65.2 |
| 2006/0030450 A1 * | 2/2006 | Kyle ................................. 477/3 |
| 2006/0213703 A1 | 9/2006 | Long |
| 2006/0293841 A1 | 12/2006 | Hrovat et al. |
| 2007/0027593 A1 | 2/2007 | Shah et al. |
| 2007/0129878 A1 | 6/2007 | Pepper |
| 2007/0135988 A1 | 6/2007 | Kidston et al. |
| 2007/0137919 A1 * | 6/2007 | Jolley ........................... 180/312 |
| 2007/0163819 A1 * | 7/2007 | Richter et al. ............... 180/65.2 |
| 2008/0208393 A1 | 8/2008 | Schricker |
| 2008/0213703 A1 | 9/2008 | Shafer et al. |
| 2008/0236910 A1 * | 10/2008 | Kejha et al. .................. 180/65.2 |
| 2008/0319596 A1 | 12/2008 | Yamada |
| 2009/0015202 A1 | 1/2009 | Miura |
| 2009/0192660 A1 | 7/2009 | Tamor et al. |
| 2009/0198398 A1 | 8/2009 | Yamada |
| 2009/0212626 A1 | 8/2009 | Snyder et al. |
| 2009/0223725 A1 * | 9/2009 | Rodriguez et al. ......... 180/65.21 |
| 2009/0259355 A1 | 10/2009 | Li |
| 2010/0001672 A1 | 1/2010 | Maeda et al. |
| 2010/0044129 A1 * | 2/2010 | Kyle ........................... 180/65.25 |
| 2010/0106351 A1 | 4/2010 | Hanssen et al. |
| 2010/0219007 A1 | 9/2010 | Dalum et al. |
| 2010/0274426 A1 | 10/2010 | Le Brusq et al. |
| 2011/0024211 A1 | 2/2011 | Kikuchi |
| 2011/0029173 A1 | 2/2011 | Hyde et al. |
| 2011/0029181 A1 | 2/2011 | Hyde et al. |
| 2011/0047102 A1 | 2/2011 | Grider et al. |
| 2011/0071712 A1 | 3/2011 | Mizuno et al. |
| 2011/0098873 A1 | 4/2011 | Koga et al. |
| 2011/0148618 A1 | 6/2011 | Harumoto et al. |
| 2011/0160990 A1 | 6/2011 | Mineta |
| 2011/0270486 A1 | 11/2011 | Stevens et al. |
| 2012/0065834 A1 | 3/2012 | Senart et al. |
| 2012/0072049 A1 | 3/2012 | Haaf et al. |
| 2012/0239462 A1 | 9/2012 | Pursell et al. |
| 2012/0323474 A1 | 12/2012 | Breed et al. |
| 2013/0046526 A1 | 2/2013 | Yucel et al. |
| 2013/0060410 A1 * | 3/2013 | Crain et al. ................... 180/65.6 |

\* cited by examiner

MOTOR INTEGRATION ASSEMBLY

CLAIM OF PRIORITY

This application claims priority under 35 USC §119(e) to U.S. Patent Application Ser. No. 61/543,940, filed on Oct. 6, 2011, the entire contents of which are hereby incorporated by reference.

TECHNICAL FIELD

This disclosure relates a motor integration assembly for converting a conventional combustion engine vehicle into a hybrid-electric vehicle.

BACKGROUND

The internal combustion engine has provided the heart of self-powered road vehicles by combusting fuel to drive pistons within cylinders such that the movements of the pistons turn a crankshaft that then turns the vehicle wheels via a drive shaft. Due to the dependence upon different types of combustible fuels (e.g., gasoline, Diesel, natural gas, etc.) to power such engines, other technologies have emerged as alternatives to the internal combustion engine. For example, electric vehicles use an electric motor for propulsion rather than being powered by an on-board internal combustion engine. Hybrid-electric vehicles have been developed that combine conventional internal combustion engine propulsion systems with electric propulsion systems. In such hybrid-electric vehicles, powering a drivetrain with an electric motor during at least a portion of a vehicle's drive cycle can achieve better fuel economy and lower emissions relative to a conventional internal combustion engine-powered vehicle, while achieving comparable performance and other positive attributes.

SUMMARY

The described systems and techniques facilitate aftermarket conversion of conventional internal combustion engine vehicles, such as commercial fleet vehicles, into hybrid-electric vehicles. Along with allowing torque produced from both on-board fuel and electrical sources to be delivered and absorbed through a drivetrain to driven wheels, the systems and techniques allow for the efficient conversion of the vehicles without calling for excessive amounts of vehicle downtime and technicians.

In one aspect, a motor integration assembly includes a supporting structure for connecting a transmission of a vehicle to a drivetrain of the vehicle, wherein the support structure includes a housing to receive a portion of the drivetrain of the vehicle. The motor integration assembly also includes a torque transfer unit for transferring torque from an electric machine to the portion of the drivetrain of the vehicle.

Implementations may include any or all of the following features. The electric machine may be located in a portion of the vehicle for a four-wheel drive component. The motor integration assembly may be positioned in a location for a tail housing of the transmission of the vehicle. The electrical machine may be located internal to the motor integration assembly, or external to motor integration assembly. The supporting structure may include a multi-piece bracket. The motor integration assembly may be substantially aligned with the transmission and the drivetrain of the vehicle along an axis of rotation. The torque transfer unit may include gearing for transferring torque from the electric machine to the drivetrain of the vehicle. The electric machine may convert electrical power to mechanical power.

In another aspect, a hybrid-electric vehicle system includes a transmission for providing torque to a drivetrain of the hybrid-electric vehicle, and, an electric machine for providing torque to the drivetrain of the hybrid-electric vehicle. The hybrid-electric vehicle system also includes a motor integration assembly that includes a supporting structure for connecting the transmission of the hybrid-electric vehicle to the drivetrain of the hybrid-electric vehicle. The support structure includes a housing to receive a portion of the drivetrain of the hybrid-electric vehicle. The motor integration assembly also includes a torque transfer unit for transferring torque from the electric machine to the portion of the drivetrain of the hybrid-electric vehicle.

Implementations may include any or all of the following features. The electric machine may be located in a portion of the vehicle for a four-wheel drive component. The motor integration assembly may be positioned in a location for a tail housing of the transmission of the vehicle. The electrical machine may be located internal to the motor integration assembly, or external to motor integration assembly. The supporting structure may include a multi-piece bracket. The motor integration assembly may be substantially aligned with the transmission and the drive electric of the vehicle along an axis of rotation. The torque transfer unit may include gearing for transferring torque from the electric machine to the drivetrain of the vehicle. The electric machine may convert electrical power to mechanical power.

In another aspect, a method of installing a hybrid-electric conversion system includes replacing a tail housing of a transmission of a vehicle with a motor integration assembly for transferring torque from a combustion engine and an electric machine to a drivetrain of the vehicle.

Implementations may include any or all of the following features. The motor integration assembly may utilize connection points of the transmission used by the tail housing.

Details of one or more implementations are set forth in the accompanying drawings and the description below. Other features, aspects and advantages will be apparent from the description and drawings, and from the claims.

DETAILED DESCRIPTION

Rather than developing and manufacturing hybrid vehicles, conventional vehicles (e.g., internal combustion engine vehicles) may be converted into hybrid-electric vehicles to reduce fuel consumption, reduce emissions, and prolong the life of the internal combustion engine and other vehicle subsystems including braking systems. For example, fleets of conventional commercial vehicles (e.g., cargo/utility/shuttle vans, livery cars, trucks, etc.) may be converted in the aftermarket into hybrid-electric vehicles rather than being replaced with typically more expensive hybrid-electric vehicles manufactured by original equipment manufacturers (OEMs). Such aftermarket conversions may also be used for converting newly manufactured vehicles prior to being delivered to a dealer. By retrofitting such fleet vehicles for hybrid-electric operation, emissions and fuel costs can be reduced along with reducing the exposure of individuals or entities to fuel price fluctuations. Additionally or alternatively, by using adaptable components and techniques, such conversions may be employed for specifications of different vehicle manufacturers and vastly different vehicles, with a wide range of vehicle missions.

Figure 1:
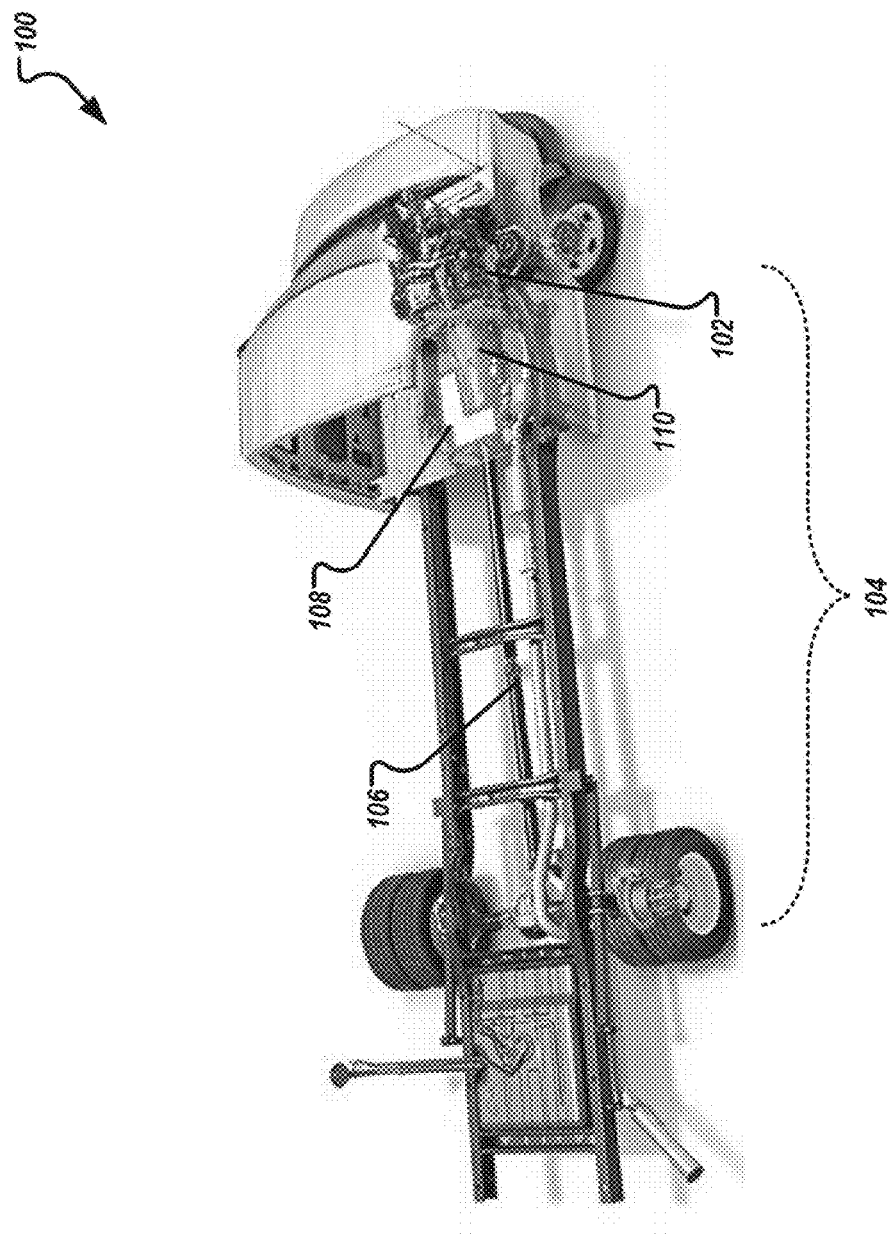
FIG. 1 illustrates a drivetrain of a fleet vehicle.

Referring to FIG. 1, a partial cut-away view of a commercial vehicle 100 is presented, with components of the vehicle's propulsion system exposed. In general an engine 102 generates and provides torque to a drivetrain 104 that in turn is provided to the wheels of the vehicle 100. A drivetrain may be considered as referring to an assembly of mechanical shafts and gear assemblies between the main transmission and driven wheels of the vehicle. Drivetrains are often considered to include the drive shaft, transfer case (for four-wheel drive vehicles), the final drive unit (including differential), and the axle connected in series. In some arrangements, the drivetrain may also be considered to include the transmission itself. In some situations, a drivetrains may be considered synonymous with the term driveline. In this example, a transmission 110 includes a driveshaft 106 that provides the torque to the rear axle of the vehicle 100. A transmission can be considered an assembly of mechanical shafts, clutches, gears or belts, etc. that transforms the vehicle combustion engine shaft speed into a wider range of shaft output speeds to provide vehicle traction from zero speed, high torque to highway speeds at lower torque. A transmission (referred to as a main transmission) typically connects the output shaft of the engine to the main drive shaft. The net "gear ratio" (drive shaft speed divided by engine shaft speed) may be controlled by a combination of automatic and manual driver inputs. While a vehicle transmission can be considered a type of "gearbox", in the context of vehicles, the term transmission is considered common. Transmission may also be generally considered to describe any mechanical system that couples power transfer between two or more mechanical power inputs or outputs. A drive shaft may be considered as referring to a rotating shaft that connects between a transmission and final drive unit. The drive shaft may include several components in series to allow axial (forward-back) movement, and lateral-vertical movements. In rear-wheel drive vehicles this shaft typically runs from a forward location, where the engine-transmission is located, to an aft location of the vehicle where the final drive/differential and rear axle is located.

To convert the vehicle 100 into a hybrid-electric vehicle, one or more techniques and methodologies may be implemented. For example, conversion may include adding at least one electric machine, an electrical energy storage system (e.g., one or more batteries) and a control unit to the vehicle (e.g., a control unit that controls and conditions power flow through the hybrid conversion components and provides control and communication interfaces to subsystems of the vehicle). In some arrangements, an electric machine can be considered a rotating electric machine that includes a rotor attached to a mechanical rotating shaft, and a stator with three-phase windings that converts and transfers power from electrical to mechanical ("motoring mode") or from mechanical to electrical ("generating or braking mode"). The electrical power can be considered proportional to voltage times current and the mechanical power being proportional to torque times speed. Typical sign conventions are that negative torque indicates power being removed from the shaft contributing to shaft deceleration and electric power generation, while positive torque indicates power being added to the shaft contributing to shaft acceleration. In some arrangements, terms as such "motor-generator", "traction motor", "traction machine", "traction drive" etc. may also be used for electric machine. In one arrangement, one or more electric machines may be implemented that are capable of bi-directional transfer between electrical and mechanical power (e.g., three-phase electrical power input to rotational driveshaft output, and the reverse power flow). As illustrated in the figure, a space 108 is defined for receiving one or more of the conversion components and to define the portions of the vehicle for mechanically affixing the components to the vehicle 100. In this example, the space 108 is adjacent to the transmission 110, which in general transmits the torque produced by the engine 102 to the wheels of the vehicle 100. To provide the drivetrain 104 with the torque produced by the electric machine (positioned within the space 108), one or more techniques may be implemented. For example, the electric machine may be coupled to the driveshaft 106 through the use of gears, belts, chains or similar systems for transferring mechanical energy. In some embodiments, the electric machine, the engine 102 and the transmission 110 may be positioned in different arrangements, for example, based upon the design of the vehicle, efficient transfer of torque from either motor, etc. For example, one or more electric machine(s) and the engine 102 may be positioned in serial arrangements, in parallel arrangements, etc. The electric machine may also be positioned ahead of the transmission 110 (e.g., an order of engine, electric machine, then transmission, or, electric machine, engine, then transmission, etc.). Additionally or alternatively, an electric machine may be located after the transmission.

Figure 2:
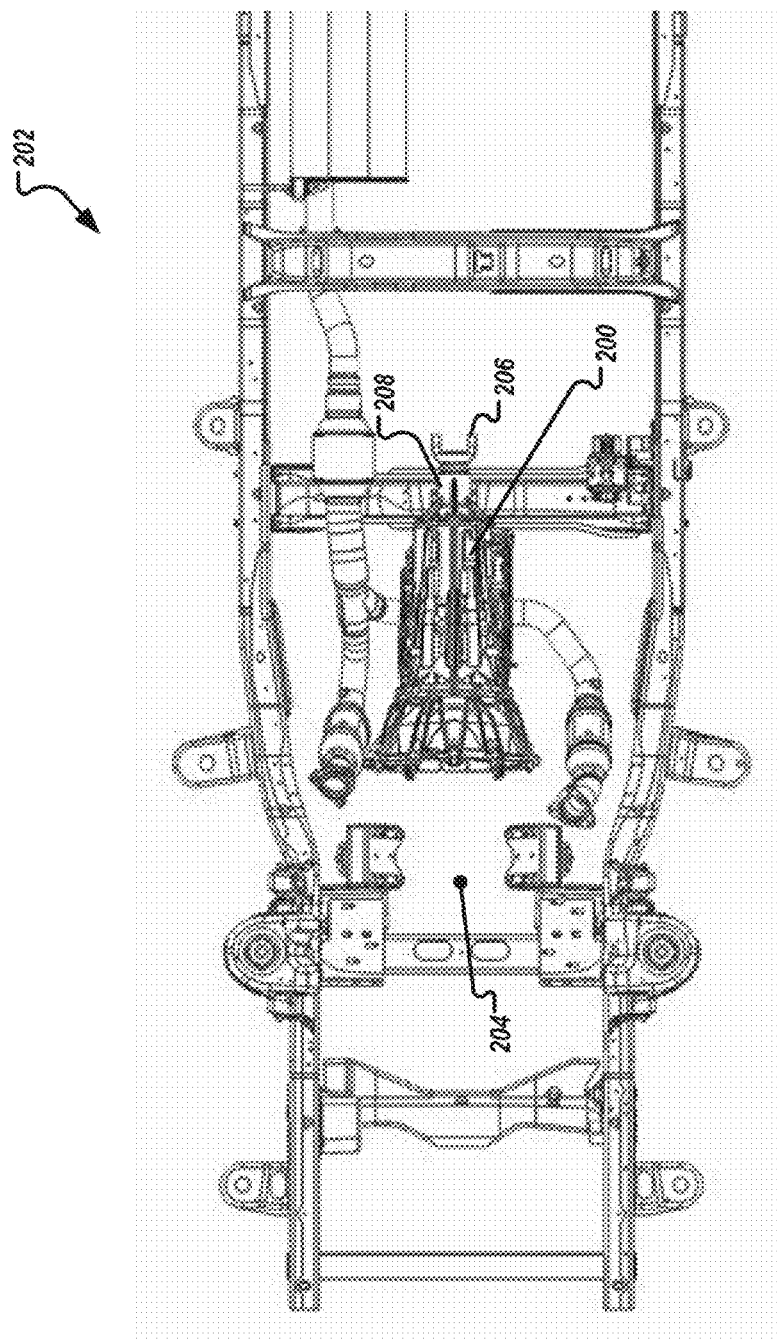
FIG. 2 illustrates a transmission system of an internal combustion engine-powered vehicle.

Referring to FIG. 2, along with introducing an electric machine into a vehicle and components for transferring torque to a drivetrain from the motor (while still optionally allowing torque to be transferred from the internal combustion engine), the system used to integrate the electric machine may implement one or more techniques for efficiently mounting the electric machine and related components. By accounting for structural aspects of the vehicle, availability of OEM components, one or more integration techniques may be developed that may be considered relatively inexpensive compared to the cost of a hybrid-electric vehicle manufactured by an OEM and low risk and non-invasive for an automobile technician to implement. Further, by employing an adaptable mounting system, various types of vehicles with different specifications and manufacturers may be converted into hybrid-electric vehicles through aftermarket modifications. Illustrated in the figure, a conventional transmission 200 is presented as mounted in a structural frame 202 of a vehicle. Though absent from the figure, an engine would typically be positioned forward (as referenced by the circle that terminates line 204) of the transmission 200 and also mounted to the structural frame 202. While a hybrid-electric conversion system (e.g., electric machine, electric energy storage system, etc.) may be positioned in various locations, efficient operation may be provided by mounting the conversion system after the transmission 200. In this arrangement, the conversion system is mounted in a space that is conventionally reserved for a four-wheel-drive (4WD) assembly. Many two-wheel-drive (2WD) trucks and commercial vehicles are designed similar to counterpart 4WD vehicles. For example, common chassis vehicles can be considered as being similarly designed and the designs are shared among manufactures. As such, vehicles having this reserved space may be converted for torque to be provided from an internal combustion engine and/or an electric machine to the driveshaft (e.g., from a slip yoke 206). A slip yoke can be considered as describing a shaft component with a female spline on one end and one end of a universal joint (u-joint) on the other end. A universal joint generally connects two parts of a drive shaft allowing lateral-vertical axis rotation. A slip yoke typically connects two parts of a drive shaft with the spline interface allowing the axial motion and the u-joint allowing lateral-vertical axis rotation. In some arrangements, one or more spaces may be identified in 4WD vehicles for receiving system components. Along with positioning conversion system components within the structural frame 200, some conventional components may be removed for conversion. For example, to appropriately couple an electrical motor to the transmission 200, a tail housing 208 of the transmission 200 may be removed along with one or more other components. A tail housing can be considered an aft end casing component of a transmission that encloses a transmission output shaft and supports the main driveshaft connected through an aft sealed opening. Along with residing in the space of the tail housing 208, the system components may provide a portion or all of the functionality of the tail housing. For example, drive shaft alignment and sealing functionality may be provided along with other capabilities of the tail housing 208. Further by utilizing attachment points (e.g., bolt holes) reserved for the tail housing 208, the system components may be efficiently installed without undue modifications to the transmission 200 and/or other portions of the vehicle frame, chassis, etc. Further, the system components may be designed for accepting components from adjacent portions of the vehicle's drivetrain (e.g., output shaft of the transmission 200, the slip yoke 206 for providing torque to a drive shaft, etc.) to further ease installation.

Figure 3:
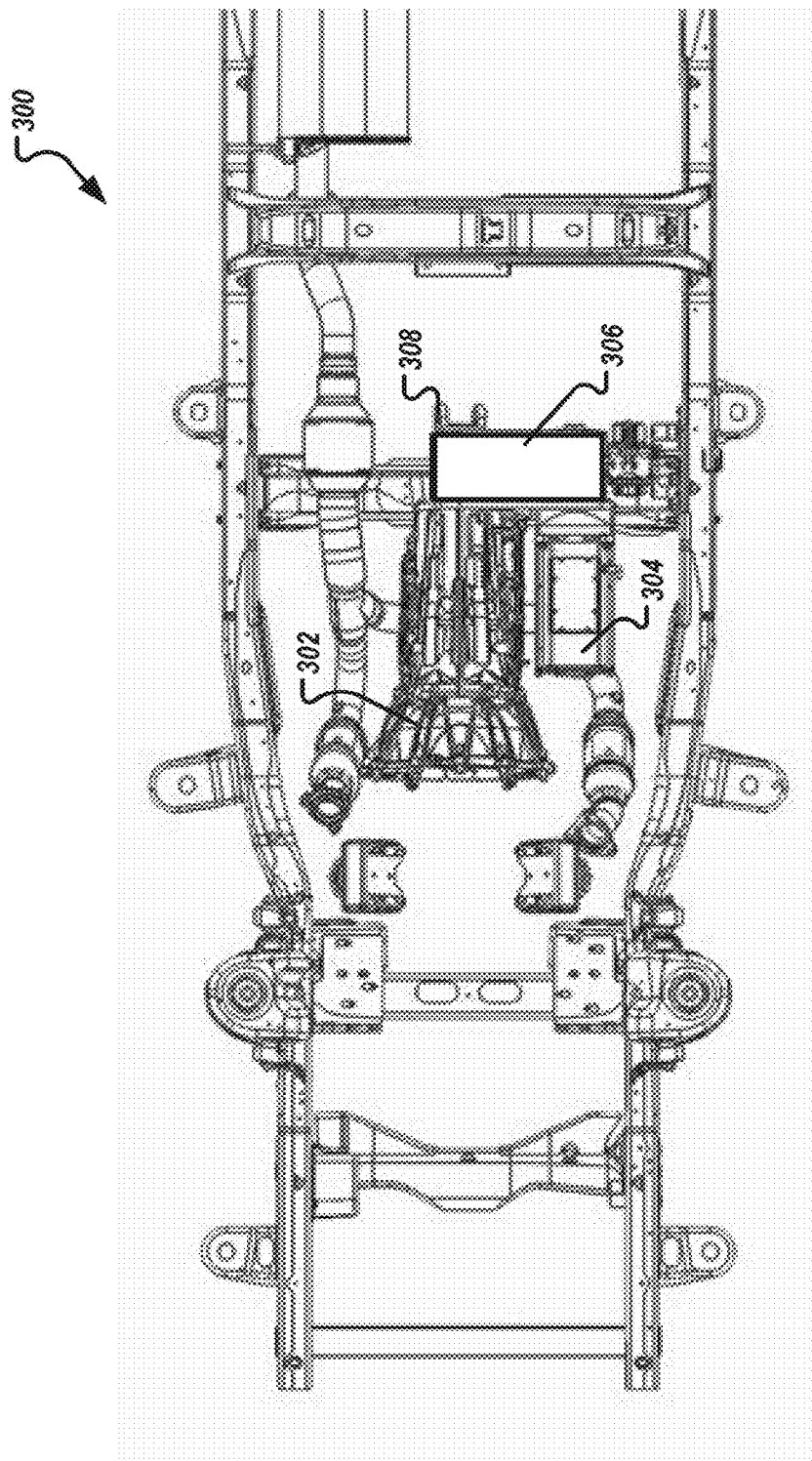
FIG. 3 illustrates an electric machine integrated into a transmission system of an internal combustion engine-powered vehicle.
Figure 4:
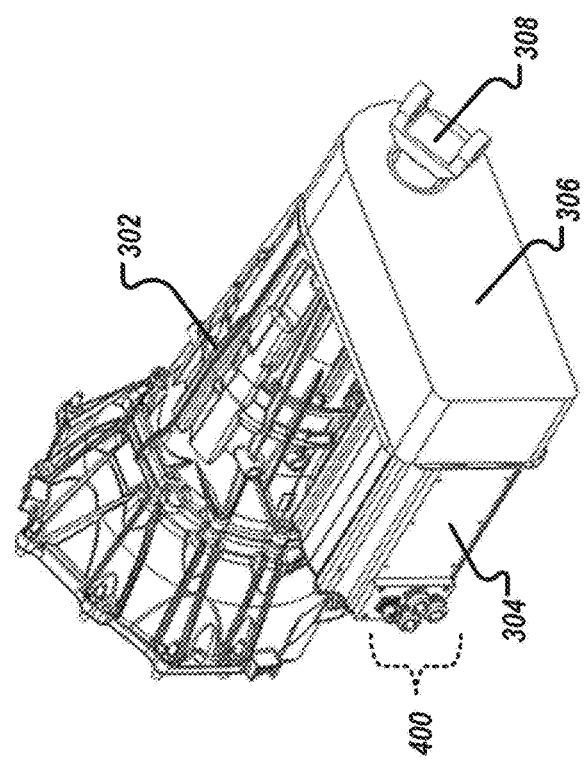
FIG. 4 illustrates a motor integration assembly.

Referring to FIG. 3, components of a hybrid conversion system are positioned within a structural frame 300 of a vehicle (similar to the frame 202 shown in FIG. 2). To position the components, a transmission 302 is modified to appropriately couple to the components of the hybrid conversion system. For example, a tail housing (not shown, but illustrated in FIG. 2 as tail housing 208) of the transmission 302 has been removed. In this particular arrangement, the newly incorporated components of the hybrid conversion system include an electric machine 304 and a motor integration assembly 306. One or more types of electric machines may be implemented for converting electrical energy into to mechanical work. In some instances, an electrical storage system (e.g., one or more batteries, ultracapacitors, etc.) or a portion of the system is located external from the electric machine 304 (e.g., located within the motor integration assembly 306); however, in some arrangements the electrical storage system or portions of the system may be incorporated into the electric machine 304. In one arrangement, along with replacing the tail housing of the transmission 302, the motor integration assembly 306 provides a coupling that transfers the mechanical energy provided the electric machine 304 to the driveshaft (not shown) via a slip yoke 308 (shown protruding from the motor integration assembly 306). Referring to FIG. 4, a three-dimensional view is presented of the transmission 302 and the components of the hybrid conversion system. From this perspective, electrical connections 400 (e.g., for control signals, electrical power input, etc.) are viewable on the housing of the electric machine 304. Additionally, the slip yoke 308 is shown protruding from an opening in the housing of the motor integration assembly 306.

Figure 5:
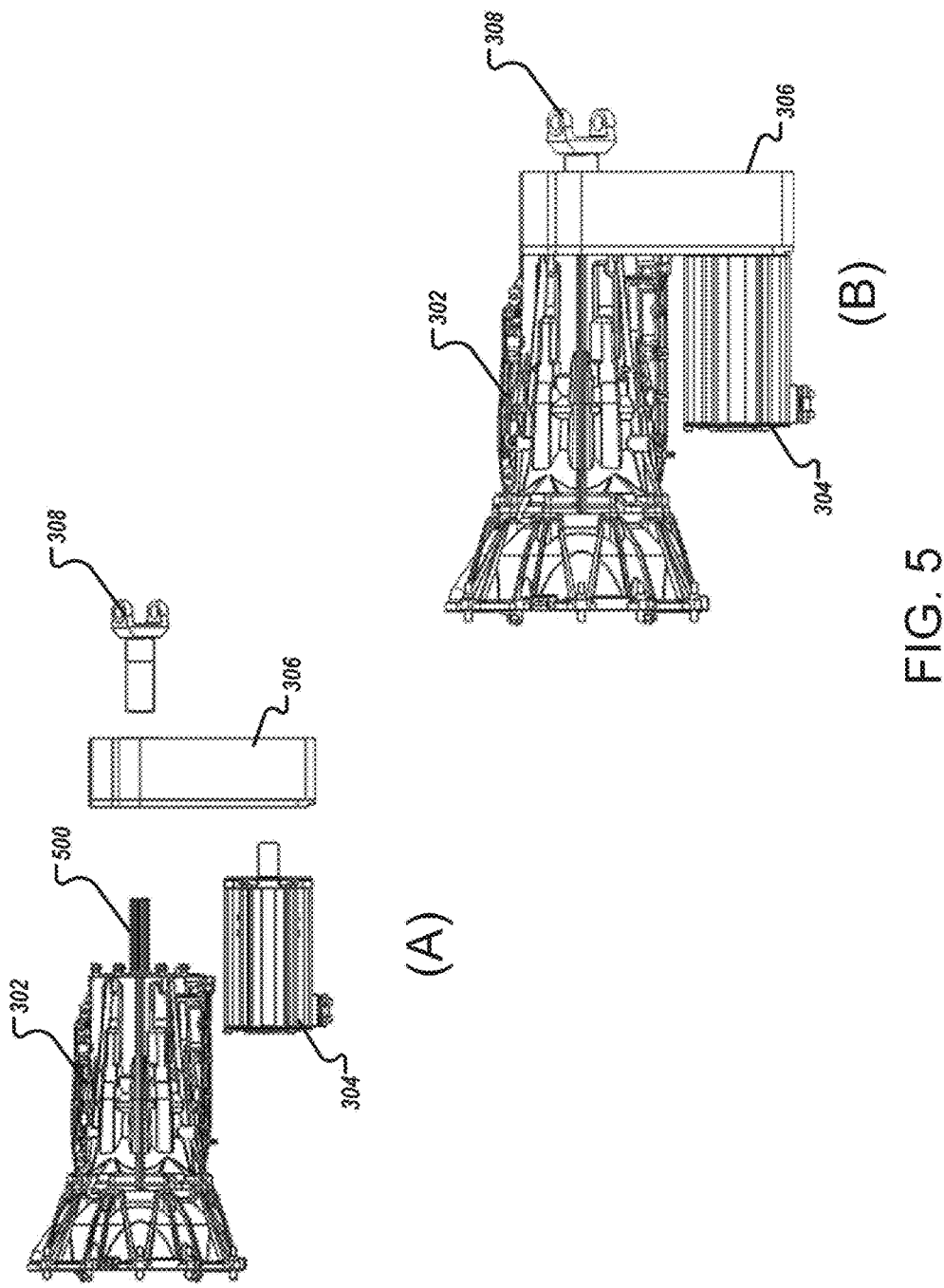
FIGS. 5(a) and (b) illustrate a motor integration assembly integrating a transmission and an electric machine.

Referring to FIGS. 5a and 5b, the integration of the hybrid conversion system components with a transmission is graphically illustrated. For example, the electric machine 304 connects into the motor integration assembly 306 and couples to the slip yoke 308 to provide the torque produced by the electric machine. The transmission 302 also connects into the motor integration assembly 306. In this particular arrangement, a tail shaft 500, which can be considered as referring to the output shaft of the main transmission typically with a spline fitting (e.g., a male spline fitting), is received by the motor integration assembly 306 and mechanically couples the torque provided by the engine to the slip yoke 308 (for delivery to a driveshaft). As such, two sources of torque are mechanically coupled to the slip yoke 308 and correspondingly to the driveshaft of the vehicle. By controlling the amount of torque provided from the two sources (e.g., in isolation or in combination), the timing that the torque is applied, etc., the vehicle may efficiently capitalize on the torque production and transfer from the combustion engine and the electric machine. Further, by designing the motor integration assembly 308 to mechanically receive the electric machine, tail shaft 500 and slip yoke 308, the hybrid conversion system may be installed with relative ease by a technician without the need of overly extensive assistance, training and instruction.

Figure 6:
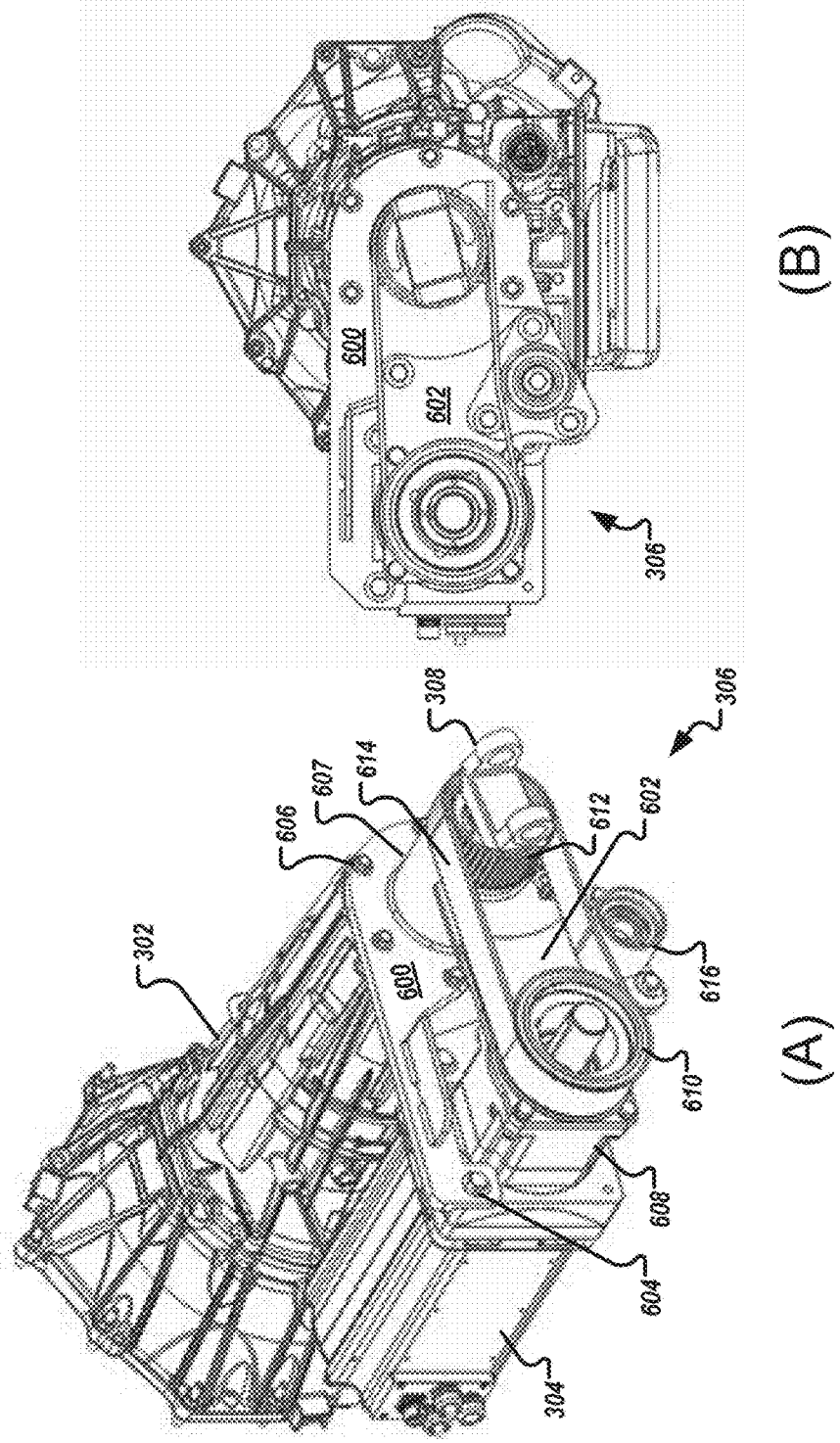
FIGS. 6(a) and (b) illustrate components of a motor integration assembly.

Referring to FIG. 6a, a three-dimensional view is presented (similar to FIG. 4) with the housing of the motor integration assembly 306 removed to expose the components within. Similarly, FIG. 6b presents an end-view of the motor integration assembly 306 with the housing removed. In general, the motor integration assembly 306 provides one or more supporting structures for securing the motor integration assembly to a transmission. In this arrangement, the supporting structure is a multi-piece bracket assembly that includes a front bracket 600 and a rear bracket 602 that provide structural support to secure the motor integration assembly 306 to the electric machine 304 and the transmission 302. In this particular example, mounting bolts (e.g., a motor mounting bolt 604, a transmission mounting bolt 606, etc.) are used, but other securing techniques and methodologies may be implemented. Along with providing the mounting structure, the motor integration assembly 306 receives the slip yoke 308 (e.g., into a tail housing 607) for transferring the torque provided by the transmission 302 (from the internal combustion engine) and the electric machine 304. As mentioned above, the motor integration assembly 306 generally replaces the tail housing of the transmission 302 with a multi-piece bracket and housing assembly. Along with providing the torque from both sources, the multi-piece bracket and housing assembly of the motor integration assembly 306 make accommodations for additional loads applied to the slip yoke 308. For example, in this arrangement radial loading is experienced by the yoke during the torque transfer from the electric machine 304.

To transfer torque, one or more torque transfer units may be implemented. In this arrangement, the electric machine 304 is mechanically connected to a gearhead unit 608 that is mounted to the front bracket 600. A gearhead unit can be considered as referring to an enclosed assembly of gears and shafts that provide a mechanical power coupling between one or more input and output shafts to provide an input-to-output shaft speed ratio. A gearhead unit may be directly coupled to an electric machine output shaft and case to provide an integrated assembly with higher or lower speed range. One or more gear ratios may be used (e.g., based on various torque requirements, motor operating speed and torques, etc.) to provide the needed torque to the drivetrain (connected to the slip yoke 308). In one particular example, a 4:1 planetary gearhead reduction unit may be used as the gearhead unit 608 to provide the required torque to the drivetrain. In alternative arrangements, the gearhead unit 608 may not be needed, for example, if an electric machine can produce the needed torque, speed, etc.

To provide the torque to the slip yoke 308, in this arrangement an output shaft of the gearhead unit 608 is mounted to a drive pulley 610. A drive pulley can be considered as referring to one of two or more pulleys in an assembly of belts and pulleys that provides a mechanical power coupling between one or more input and output shafts to provide an input-to-output shaft speed ratio. The pulley can be a wheel on a rotating shaft around which a tensioned belt runs that also encloses at least one other pulley. The drive pulley can be considered the pulley on the shaft that is providing the input power to the coupling system. To complete the torque transfer, a driven pulley 612 is attached to the slip yoke 308. With reference to a drive pulley, a driven pulley can be considered as the pulley on the output shaft of the coupling system. In this arrangement, a belt 614 connects the drive pulley 610 and driven pulley 612. While this belt assembly transfers torque from the electric machine 304 to a driveshaft (not shown) in this arrangement, other techniques and methodologies may be utilized for torque transfer. For example, a chain and sprocket assembly or another mechanical coupling (individually or in combination with a belt assembly, chain and sprocket assembly, etc.) may be implemented. However, a belt and pulley assembly may be considered to need less maintenance than a chain assembly or other types of assemblies. In some arrangements, torque may be transferred from the electric machine 304 to the slip yolk 308 by a gear assembly. For example, a gear assembly could replace the gearhead unit 608, be used in combination with the gearhead unit, used in combination with another technique, etc. However, manufacturing the gear assembly may increase cost and be less adaptable, compared to a belt assembly or a chain assembly. One or more modifications and adjustments may be made to the components of the motor integration assembly 306. For example, a belt or chain can be adapted for drivetrains produced by different manufacturers by modifying one or more components such as a bracket (e.g., for mounting a transmission), changing the length of a belt, etc.

The rear bracket 602 provides support for the radial loading from the torque provided from the electric machine 304 (e.g., transferred by the belt and pulley assembly). In this arrangement, the rear bracket 602 is attached to a rear face of the gearhead unit 608, however, one or more other mounting techniques may be utilized in other arrangements. The rear bracket 602 also provides mounting support for a tensioner assembly 616. In general, the tensioner assembly 616 provides static tension for the belt 614 and allows for the belt tension to be adjusted.

Figure 7:
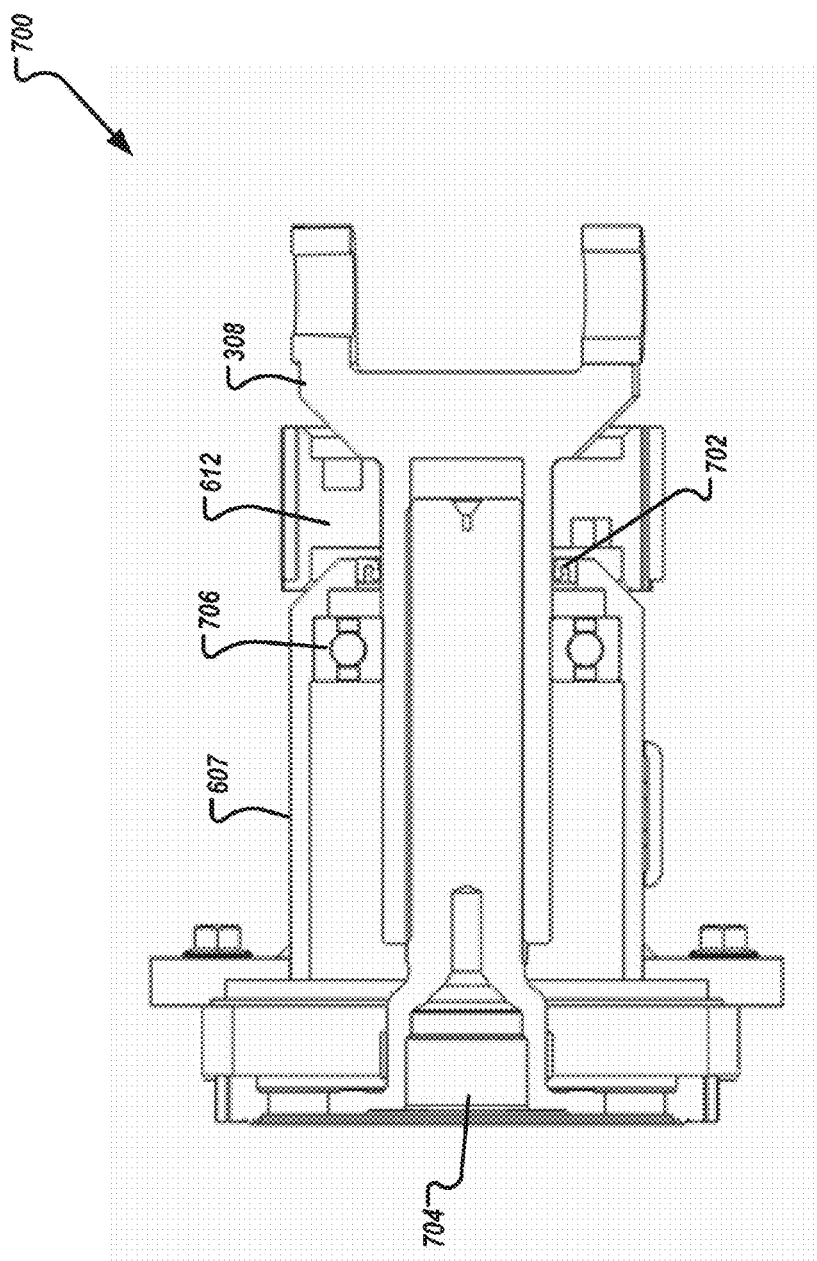
FIG. 7 illustrates a cross section view of a portion of a motor integration assembly.

Referring to FIG. 7, a cross-sectional view 700 is illustrated of the portion of the motor integration assembly 306 that couples the torque from the transmission 302 and the electric machine 304 (as provided by the driven pulley 612). In general, the slip yoke 308 is received into the tail housing 607 of the motor integration assembly 306 and held by a seal 702. The slip yoke 308 receives the driving torque from the transmission 302 via a tail shaft 704 (that fits into the slip yoke). In conventional systems longitudinal movement may be allowed between the tail shaft 704 and the slip yoke 308.

For example, the slip yoke 308 would be allowed to move longitudinally as the rear suspension of the vehicle cycles. However, the slip yoke 308 also receives torque from the electric machine 304, for example, from the driven pulley 612 of the belt and pulley assembly. As such, to appropriately receive the torque from the driven pulley 612, the longitudinal motion of the slip yoke 308 needs to be restrained. One or more techniques maybe implemented to restrain this longitudinal motion. For example, a support bearing mount 706 may be attached to a member (e.g., cross member) of the frame of the vehicle. In some arrangements a telescoping driveshaft may be used to supplant the longitudinal motion of the restrained slip yoke 308. To accommodate different types of vehicles (e.g., vehicles of reduced length), transmissions, etc. the length of the driveshaft may be adjusted (e.g., lengthened, shortened, etc.).

Other techniques and methodologies may be implemented to restrain the movement of the slip yoke 308. For example, the driven pulley 612 may be coupled to the output shaft (e.g., the tail shaft 704) of the transmission 302. Such a coupling may be provided by implementing internal splines in the driven pulley (rather than mounting the driven pulley 612 to the outer diameter of the slip yoke 308). In another implementation, one or more splined shafts (e.g., with internal splines, external splines, a combination of internal and external splines, etc.) may be used to receive torque from a transmission and an electric machine (e.g., via one or more gears) and transfer the torque to the drivetrain. A splined shaft may be considered as referring to a shaft with an axial scored, toothed, etc., pattern along the inside "female" or outside "male" diameter of the shaft that allows mechanical coupling typically to another splined shaft with a mating pattern. A splined shaft coupling generally allows an axial motion degree of freedom.

Figure 8:
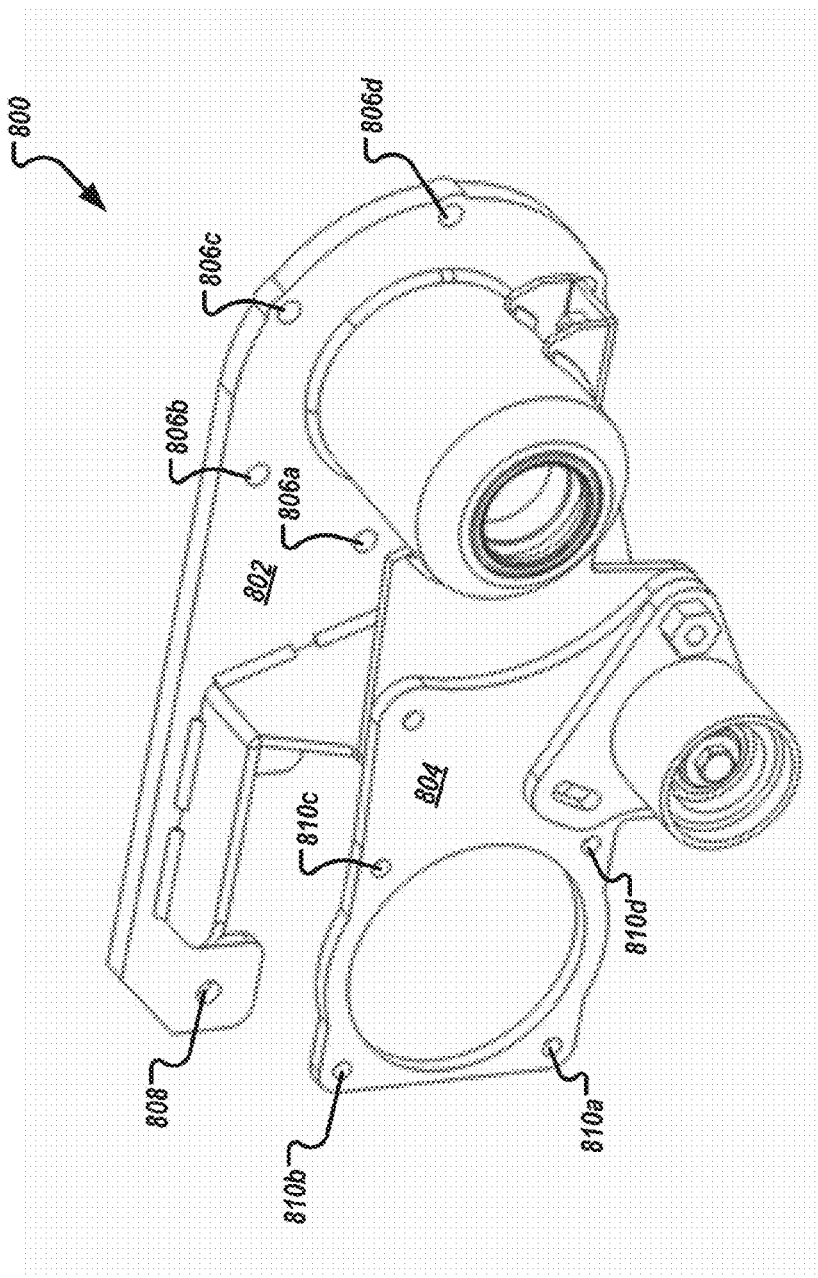
FIG. 8 illustrates a bracket structure of a motor integration assembly.

Referring to FIG. 8, one example of a multi-piece bracket 800 of the motor integration assembly 306 is illustrated and includes a front bracket 802 and a rear bracket 804. In general, the front bracket 802 mounts to the transmission and the electric machine. In this example, multiple holes 806*a-d* are included in the front bracket 802 for mounting (e.g., bolt) to the transmission. Similar, one or more holes (e.g., hole 808) may be included in the front bracket 802 for mounting to the housing (or other structural portion) of an electric machine. Similarly, the rear bracket 804 may include multiple holes (e.g., holes 810*a-d*) for secure mounting to a gear unit. In general, the faces of the front and rear brackets 802, 804 are machined to be substantially flat to appropriately mate with the surfaces of the transmission and the electric machine with relative ease. Additionally, the location and properties of the holes (e.g., diameter, depth, etc.) included in the front and/or rear brackets 802, 804 are typically produced to substantially match (e.g., nearly exactly match) the bolt pattern on corresponding surfaces of the transmission and the housing (or other structural portion) of the electric machine such that a technician can accurately align and secure the structures with relative ease. In some arrangements the hole patterns included in the front and rear brackets 802, 804 may be established by the manufacturer(s) of the structural support of the electric machine and/or the transmission. Alternatively, in some arrangements, one or more holes included in the brackets 802, 804 may need corresponding holes produced (e.g., drilled) into the electric machine support, transmission, etc. One or more shapes, surface features, etc. may be included in the multi-piece bracket 800 to assist with alignment and installation. For example, shoulders or other shapes, keys, etc. may be included in the design to assist installation. As such, accuracy and precision needed for installation may be primarily driven by machine process tolerance.

Figure 9:
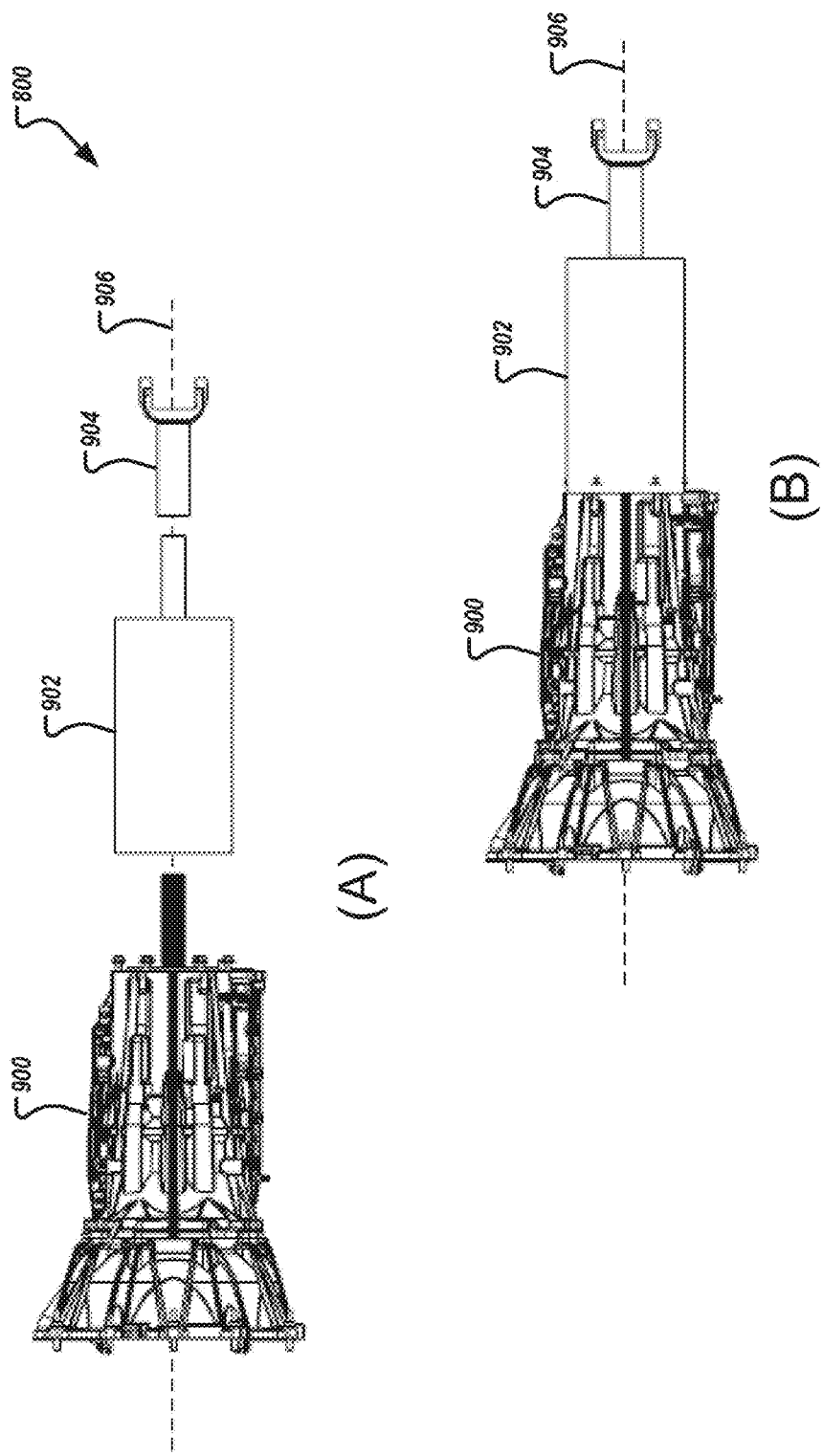
FIGS. 9(a) and (b) illustrate a motor integration assembly integrating a transmission and an electric machine.

Referring to FIGS. 9a and 9b, another arrangement is graphically illustrated for integrating hybrid conversion system components with a transmission. In this arrangement, an electric machine is included in a motor integration assembly. Additionally, system components are arranged in a serial manner, referred to as an in-line arrangement in which "in-line" refers to the physical arrangement of system components associated with rotational movement being substantially aligned along an axis of rotation. In this particular arrangement, a transmission 900, a motor integration assembly 902 (that includes one or more electric machines) and a slip yoke 904 are substantially aligned along an axis 906. The motor integration assembly 902 may implement one or more gears, belts, etc. (alone or in combination) along with other types of technology to provide its functionality. For example, one or more planetary gear stages may be incorporated into the motor integration assembly 902 for this in-line arrangement. In some arrangements, a direct drive arrangement may be implemented in which the components align and directly power rotation with the motor integration assembly 902 being substantially absent gearing. In the figure, the motor integration assembly 902 is illustrated as replacing a tail housing. However, the motor integration assembly 902 may be positioned in different locations in some arrangements. For example, the motor integration assembly 902 may be located at a position farther back along the vehicle drive line. In such arrangements, the drive shaft may be split into at least two sections, one being located forward to the motor integration assembly and one being located aft of the motor integration assembly. One or more techniques may be implemented to connect the motor integration assembly and the corresponding drive shaft sections, for example, one or more combinations of slip yokes, u-joints, and bearings may be implemented to support and interconnect the driveline. Such arrangements may be advantageous from the standpoint of space availability on different vehicle types, models, etc.

To execute such vehicle conversions, one or more techniques may be implemented for converting, for example, aftermarket conventional internal combustion engine vehicles, such as commercial fleet vehicles, into hybrid-electric vehicles. For example, one technique may include replacing a tail housing of a transmission of a vehicle with a motor integration assembly. The motor integration assembly may be capable of transferring torque from a combustion engine and an electric machine to a drivetrain of the vehicle. To replace the tail housing, the motor integration assembly may utilize connection points (e.g., one or more bolt patterns) of the transmission of the tail housing. Such replacement techniques may allow for the conversions to be efficiently completed and without needing undue technician time and downtime for the vehicles.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the invention have been described. Other embodiments are within the scope of the following claims. For example, the actions recited in the claims can be performed in a different order and still achieve desirable results.

What is claimed is:

1. A motor integration assembly, comprising:
   a housing physically attachable, by connectors, to a vehicle transmission to replace a tail housing of the vehicle transmission with the motor integration assembly for converting a vehicle into a hybrid-electric vehicle, the housing containing:
      a supporting structure configured for connecting a transmission output shaft of the vehicle to a drivetrain of the vehicle and to receive a portion of the drivetrain of the vehicle and receive the transmission output shaft;
      an electric machine for providing torque to the drivetrain of the vehicle;
      a torque transfer unit for transferring torque from the electric machine to the portion of the drivetrain of the vehicle and for transferring torque from the transmission output shaft to the portion of the drivetrain of the vehicle; and
      an electrical storage system connectable to the electric machine,
   wherein electrical connections are attached to the housing, and
   wherein the housing is attachable to the vehicle transmission at a first side of the housing and is attachable to the portion of the drivetrain of the vehicle at a second side of the housing such that the motor integration assembly is physically attached to the transmission.

2. The motor integration assembly of claim 1, wherein the electric machine is located in a portion of the vehicle for a four-wheel drive component.

3. The motor integration assembly of claim 1, wherein the motor integration assembly is positioned in a location for a tail housing of the transmission of the vehicle.

4. The motor integration assembly of claim 1, wherein the supporting structure includes a multi-piece bracket.

5. The motor integration assembly of claim 1, wherein the motor integration assembly is substantially aligned with the transmission and the drivetrain of the vehicle along an axis of rotation.

6. The motor integration assembly of claim 1, wherein the torque transfer unit includes gearing for transferring torque from the electric machine to the drivetrain of the vehicle.

7. The motor integration assembly of claim 1, wherein the electric machine converts electrical power to mechanical power.

8. The motor integration assembly of claim 1, wherein the drivetrain is a telescoping drivetrain.

9. The motor integration assembly of claim 1, wherein the motor integration assembly includes a support bearing mount attached to a cross member of a frame of the vehicle.

10. The motor integration assembly of claim 1, comprising an electrical storage system incorporated into the electric machine.

11. The motor integration assembly of claim 1, wherein the housing is directly attached to the vehicle transmission.

12. A hybrid-electric vehicle system, comprising:
a transmission for providing torque to a drivetrain of the hybrid-electric vehicle; and
a motor integration assembly, comprising,
a housing physically attachable, by connectors, to the transmission to replace a tail housing of the transmission with the motor integration assembly for converting a vehicle into the hybrid-electric vehicle, the housing containing:
a supporting structure configured for connecting an output shaft of the transmission of the hybrid-electric vehicle to the drivetrain of the hybrid-electric vehicle and to receive a portion of the drivetrain of the hybrid-electric vehicle and to receive the output shaft of the transmission,
an electric machine for providing torque to the drivetrain of the hybrid-electric vehicle,
a torque transfer unit for transferring torque from the electric machine to the portion of the drivetrain of the hybrid-electric vehicle and for transferring torque from the output shaft of the transmission to the portion of the drivetrain of the vehicle, and
an electrical storage system connectable to the electric machine,
wherein electrical connections are attached to the housing, and wherein the housing is attachable to the vehicle transmission at a first side of the housing and is attachable to the portion of the drivetrain of the vehicle at a second side of the housing such that the motor integration assembly is physically attached to the transmission.

13. The hybrid-electric vehicle system of claim 12, wherein the electric machine is located in a portion of the vehicle for a four-wheel drive component.

14. The hybrid-electric vehicle system of claim 12, wherein the motor integration assembly is positioned in a location for a tail housing of the transmission of the vehicle.

15. The hybrid-electric vehicle system of claim 12, wherein the supporting structure includes a multi-piece bracket.

16. The hybrid-electric vehicle system of claim 12, wherein the motor integration assembly is substantially aligned with the transmission and the drive electric of the vehicle along an axis of rotation.

17. The hybrid-electric vehicle system of claim 12, wherein the torque transfer unit includes gearing for transferring torque from the electric machine to the drivetrain of the vehicle.

18. The hybrid-electric vehicle system of claim 12, wherein the electric machine converts electrical power to mechanical power.

19. The hybrid-electric vehicle system of claim 12, wherein the housing is directly attached to the vehicle transmission.

20. A method of installing a hybrid-electric conversion system, comprising:
replacing a tail housing of a transmission of a vehicle with a motor integration assembly for transferring torque from a combustion engine and an electric machine to a drivetrain of the vehicle wherein the motor integration assembly includes:
a housing physically attachable, by connectors, to the transmission to replace the tail housing of the transmission with the motor integration assembly for converting the vehicle into a hybrid-electric vehicle, the housing containing:
a supporting structure configured for connecting the transmission of a vehicle to a drivetrain of the vehicle, and to receive a portion of the drivetrain of the vehicle;
an electric machine for providing torque to the drivetrain of the vehicle;
a torque transfer unit for transferring torque from the electric machine to the portion of the drivetrain of the vehicle and for transferring torque from the combustion engine to the portion of the drivetrain of the vehicle, and
an electrical storage system connectable to the electric machine,
wherein electrical connections are attached to the housing and wherein the housing is attachable to the vehicle transmission at a first side of the housing and is attachable to the portion of the drivetrain of the vehicle at a second side of the housing such that the motor integration assembly is physically attached to the transmission.

21. The method of claim 20, wherein the motor integration assembly utilizes connection points of the transmission used by the tail housing.

22. The method of claim 20, wherein the housing is directly attached to the vehicle transmission.

* * * * *